United States Patent [19]

Otani et al.

[11] Patent Number: 5,148,451
[45] Date of Patent: Sep. 15, 1992

[54] CARRIER REGENERATION DEVICE CORRECTLY OPERABLE IN MOBILE SATELLITE COMMUNICATION

[75] Inventors: Susumu Otani; Motoya Iwasaki, both of Tokyo, Japan

[73] Assignee: NEC Corporation, Japan

[21] Appl. No.: 612,087

[22] Filed: Nov. 9, 1990

[30] Foreign Application Priority Data

Nov. 10, 1989 [JP] Japan .................................. 1-291320

[51] Int. Cl.$^5$ ............................................ H04L 27/06
[52] U.S. Cl. ....................................... 375/97; 329/306
[58] Field of Search ................ 375/39, 96, 97, 106; 329/306, 307, 323, 350

[56] References Cited

U.S. PATENT DOCUMENTS

| | | | |
|---|---|---|---|
| 4,253,189 | 2/1981 | Lemoussu et al. | 375/97 |
| 4,426,712 | 1/1984 | Gorski-Popiel | 375/97 |
| 4,485,477 | 11/1984 | Nossen | 375/97 |
| 4,538,280 | 8/1985 | Mosley, Jr. et al. | 375/96 |

Primary Examiner—Stephen Chin
Attorney, Agent, or Firm—Ostrolenk, Faber, Gerb & Soffen

[57] ABSTRACT

Supplied with an input signal into which a carrier signal is modulated at a frame period by a data signal and unique words periodically interspersed throughout the data signal, a demodulating circuit (16) quadrature demodulates the input signal into an output signal. A cross-correlating circuit (23) calculates a cross-correlation coefficient between the output signal and a locally known unique word. A frame synchronizing circuit (24) compares the cross-correlation coefficient with a predetermined threshold value and delivers an aperture when the cross-correlation coefficient is below the predetermined threshold value. A phase calculating circuit (25) calculates phase errors between a recovered carrier signal recovered from the output signal and a regenerated carrier signal which is a correct reproduction of the carrier signal. The phase errors are set in a carrier regenerating circuit (17) to render the recovered carrier signal identical with the regenerated carrier signal at the aperture interval. Preferably, a frequency calculating circuit calculates frequency errors between the recovered and the regenerated carrier signals for use in making the recovered carrier signal identical with the regenerated carrier signal not only as regards phase but also as regards frequency.

6 Claims, 6 Drawing Sheets

CARRIER REGENERATION DEVICE CORRECTLY OPERABLE IN MOBILE SATELLITE COMMUNICATION

BACKGROUND OF THE INVENTION

This invention relates to a carrier regenerating or recovery device for use in a mobile station of a mobile satellite communication network.

In mobile satellite communication, a modulated signal is transmitted from a master station to mobile stations and from each mobile station to the master station. The modulated signal is derived by modulating a carrier signal at a frame period by a data signal representative of a message and by unique words which are periodically interspersed in the data signal. The modulated signal therefore comprises a modulated data signal and modulated unique words and will hereafter be referred to as a modulated overall signal. The unique words are preliminarily known at the mobile stations. Such a unique word will herein be called a locally known unique word.

In order to get primarily the message, each mobile station comprises a carrier regenerating device for regenerating the carrier signal as a regenerated carrier signal from the modulated overall signal received at the mobile station under consideration as an input modulated signal having the frame period and comprising the modulated data signal and the modulated unique words which are periodically interspersed in the modulated data signal. The carrier regenerating device comprises a demodulating circuit for using the regenerated carrier signal in quadrature demodulating the input modulated signal to produce a demodulated overall signal which comprises a demodulated data signal representative of the message and demodulated unique words. A conventional carrier regenerating or recovery circuit is for regenerating or producing the regenerated carrier signal from the demodulated overall signal. A carrier regenerating loop is therefore formed by the demodulating circuit and the carrier regenerating circuit.

The carrier regenerating loop is well operable insofar as the input modulated signal is supplied thereto steadily above a predetermined signal to noise (S/N) ratio. It should, however, be noted that the carrier regenerating loop may not always be supplied with the input modulated signal above the predetermined signal to noise ratio. For example, the mobile station moves from a location to another location and may be subjected to shadowing by buildings and tree depending on the location. In a worst case, the carrier regenerating loop can not receive the input modulated signal at all. In such an event, the carrier regenerating circuit is put into a free running state. The regenerated carrier signal steps out of frame synchronism, namely, out of synchronism with the frame period. As a result, a phase shift occurs in the regenerated carrier signal. In addition, a frequency shift may appear in the regenerated carrier signal.

The mobile station may move in due course to a location where the carrier regenerating loop can receive the input modulated signal above the predetermined signal to noise ratio. It takes, however, a long recovery time for the carrier regenerating circuit to regenerate the regenerated carrier signal again in synchronism with the frame period. This results in a long-continued and disagreeable click noise when the message is an audible one.

SUMMARY OF THE INVENTION

It is therefore a principal object of the present invention to provide a carrier regenerating device for use in a mobile station of mobile satellite communication, which device is always correctly operable even when the mobile station is in a location susceptible to shadowing.

It is another principal object of this invention to provide a carrier regenerating device of the type described, which can recover frame synchronism of a recovered carrier signal as soon as possible when the mobile station moves away from the location subjected to the shadowing.

It is still another principal object of this invention to provide a carrier regenerating device of the type described, which comprises, besides a conventional carrier regenerating loop, a carrier regenerating subloop for correcting a phase error of the recovered carrier signal.

It is a subordinate object of this invention to provide a carrier regenerating device of the type described, in which the carrier regenerating subloop is for additionally correcting a frequency error of the recovered carrier signal.

Other objects of this invention will become clear as the description proceeds.

On describing the gist of this invention, it is possible to understand that a carrier regenerating device is for regenerating a regenerated carrier signal from a modulated overall signal having a frame period and comprising a modulated data signal and modulated unique words which are periodically interspersed in the modulated data signal and comprises: (a) a demodulating circuit for using the regenerated carrier signal in qudrature demodulating the modulated overall signal to produce a demodulated overall signal comprising a demodulated data signal and demodulated unique words and (b) a carrier regenerating circuit for recovering a recovered carrier signal from the demodulated overall signal.

According to this invention, the above-understood carrier regenerating device is characterised by: (1) a cross-correlating circuit for calculating a cross-correlation coefficient between the demodulated overall signal and a locally known unique word; (2) a frame synchronizing circuit for using the cross-correlation coefficient in producing an aperture signal which defines aperture intervals at the frame period; (3) a phase error calculating circuit for using the cross-correlation coefficient in calculating a phase error which the recovered carrier signal has relative to the regenerated carrier signal; and (4) correction setting means for using the aperture signal in setting the phase error at the aperture intervals in the carrier regenerating circuit to make the recovered carrier signal become the regenerated carrier signal.

From a different point of view, the above-understood carrier regenerating device is characterised according to this invention by: (1) a cross-correlating circuit for calculating a cross-correlation coefficient between the demodulated overall signal and a locally known unique word; (2) a frame synchronizing circuit for using the cross-correlation coefficient in producing an aperture signal which defines aperture intervals at the frame period; (3) a phase error calculating circuit for using the cross-correlation coefficient and the aperture signal in calculating phase errors which the recovered carrier signal has relative to the regenerated carrier signal at the aperture intervals, respectively; and (4) correction setting means for successively setting the phase errors in the carrier regenerating circuit at the aperture intervals to make the recovered carrier signal become the regenerated carrier signal.

DESCRIPTION OF THE PREFERRED EMBODIMENTS

Figure 1:
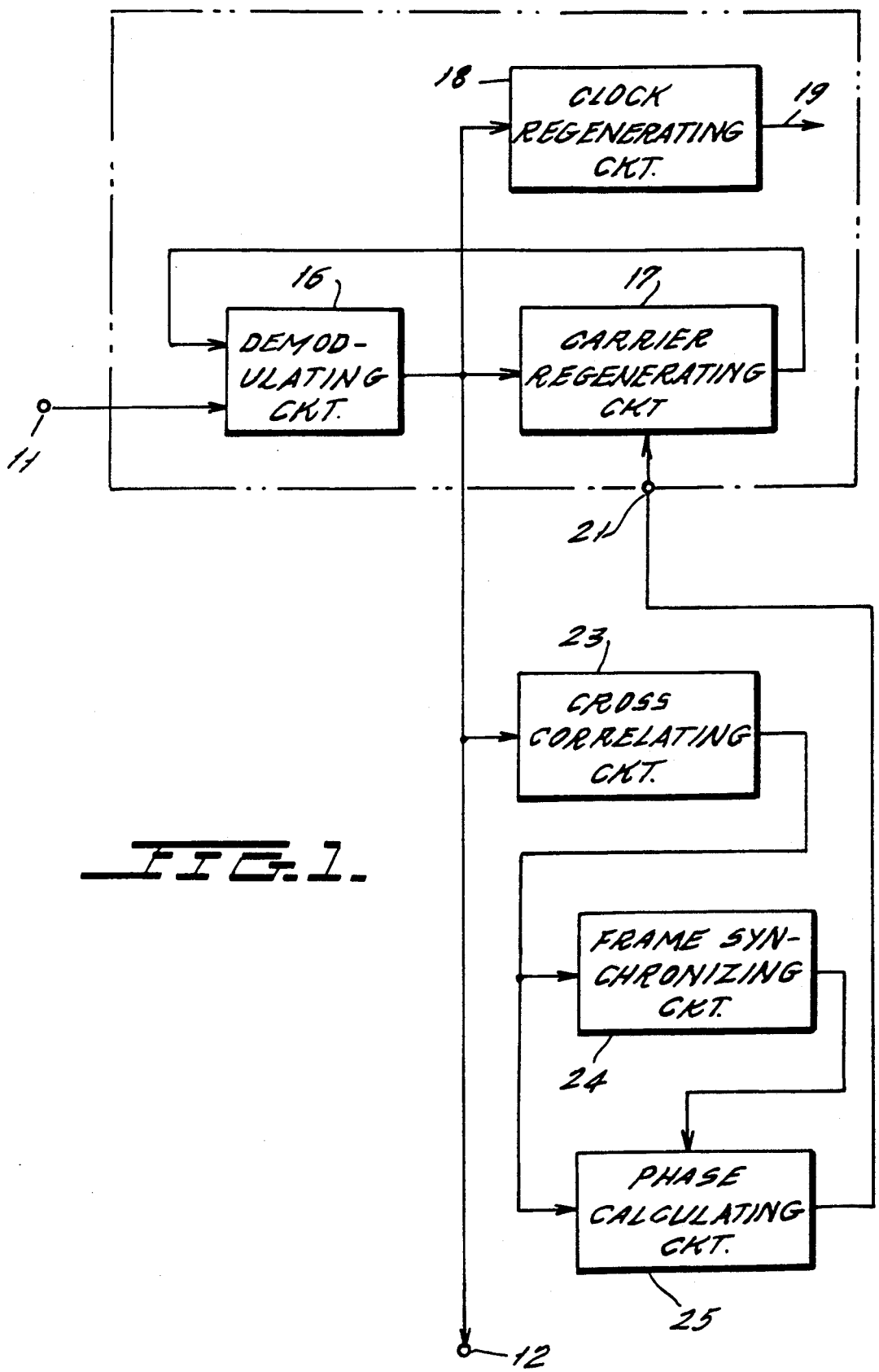
FIG. 1 is a block diagram of a carrier regenerating device according to a first embodiment of the instant invention.

Referring to FIG. 1, attention will be directed to a carrier regenerating device according to a first embodiment of the present invention. The carrier regenerating device is for use in a mobile station of a mobile satellite communication network which comprises a master station for such mobile stations. It will be assumed that a carrier signal is subjected to modulation at the master station and with a frame period into a modulated signal by a data signal representative of a message and that unique words are periodically interspersed at the frame period throughout the data signal. The unique words are known at the mobile station. Such a unique word is therefore referred to herein as a locally known unique word.

Inasmuch as the carrier signal is modulated at the master station by the data signal or by the locally known unique word, the modulated signal comprises a modulated data signal and modulated unique words and is herein called a modulated overall signal. The mobile station has demodulator input and output terminals 11 and 12. Through a receiving unit which is usual in the mobile station and is therefore not shown, the demodulator input terminal 11 is supplied with the modulated overall signal as an input modulated signal.

The carrier regenerating device is for regenerating the carrier signal from the input modulated signal as a regenerated carrier signal in the manner which will become clear as the description proceeds. An ordinary coherent demodulator unit 15 is supplied with the input modulated signal through the demodulator input terminal 11 and is for demodulating the input modulated signal into an output demodulated signal which comprises a demodulated data signal and demodulated unique words. The output demodulated signal may alternatively be called either a demodulated data sequence or a demodulated overall signal and is delivered to the demodulator output terminal 12.

A demodulating circuit 16 is supplied with the input modulated signal from the demodulator input terminal 11 and with the regenerated carrier signal. The demodulating circuit 16 is for producing the demodulated data sequence in the manner known in the art. The demodulated data sequence is delivered not only to the demodulator output terminal 12 but also to a carrier regenerating or recovery circuit 17 and to a clock regenerating circuit 18. The carrier regenerating circuit 17 is for supplying a recovered carrier signal to the demodulating circuit 16. The clock regenerating circuit 18 is for delivering a regenerated clock signal to a clock regenerator output connection 19. Inasmuch as the regenerated clock signal is used in other parts of the mobile station in the known manner, the clock regenerator output connection 19 is only partly illustrated.

Insofar as the input modulated signal is supplied to the demodulator input terminal 11 above a predetermined signal to noise (S/N) ratio, the recovered carrier signal is correctly coincident with the regenerated carrier signal. When the input modulated signal is delivered to the terminal 11 with a severely attenuated level, the carrier regenerating circuit 17 is put into a free running state. In this event, the recovered carrier signal may step out of frame synchronism, namely, out of synchronism with the frame period. As a result, the recovered carrier signal is undesiredly given a phase error relative to the regenerated carrier signal.

In order to make the carrier regenerating circuit 17 correctly produce the regenerated carrier signal, quadrature demodulation is used in the demodulating circuit 17. The demodulated data sequence therefore becomes a quadrature demodulated signal which is a complex-valued signal and can be represented by real and imaginary signal components. In any event, a carrier regenerating loop is formed by a combination of the demodulating circuit 16 and the carrier regenerating circuit 17.

The carrier regenerating circuit 17 comprises an adjusting element which will later be illustrated and has first and second control terminals 21 and 22 which are depicted separately from the carrier regenerating circuit 17 merely for convenience of illustration. A cross-correlating circuit 23 is supplied with the demodulated data signal from the demodulating circuit 16. The cross-correlating circuit 23 is for locating or detecting the demodulated unique words in the demodulated data sequence by calculating a cross-correlation coefficient between the demodulated data sequence and the locally known unique word. The cross-correlating circuit 23 thereby produces a cross-correlation signal which typically represents the cross-correlation coefficient and may alternatively be related to the cross-correlation coefficient.

A frame synchronizing circuit 24 is supplied with the cross-correlation signal and compares a level of the cross-correlation signal with a predetermined threshold value. The frame synchronizing circuit 24 outputs an aperture signal that is synchronized with the unique words, if the level of the cross-correlation signal is lower than the threshold value, i.e., if the frame synchronizm is not established. The frame synchronizing circuit 24 does not output the aperture signal, if the level of the cross-correlation signal is equal to or higher than the threshold value, i.e., if the frame synchronizm is established.

A phase error calculating circuit 25 is supplied with the cross-correlation signal and the aperture signal and is for calculating the phase error in the manner which will shortly be described. The phase error calculating circuit 25 thereby produces a phase error signal which represents the phase error and is delivered to the first control terminal 21 when the circuit 25 is supplied with the aperture. The phase error calculating circuit 25 delivers a 0 level as the phase error signal to a first control terminal 21 when the circuit 25 is not supplied with the aperture.

This means that the aperture signal may define timing of adjustment of the adjusting element in the carrier regenerating circuit 17 by aperture interval. Supplied to the first control terminal 21, the phase error signal is used to adjust the adjusting element at the aperture interval. The adjusting element may thereby correct the phase error of the recovered carrier signal to make the recovered carrier signal become identical with the regenerated carrier signal.

It may be mentioned here that the carrier regenerating circuit 17 produces the recovered carrier signal with a carrier signal phase angle which may or may not be identical with a correct phase angle of the regenerated carrier signal. Using the cross-correlation signal and the aperture signal, the phase error calculating circuit 25 calculates the correct phase angle and may alternatively be called a phase calculating circuit. A combination of the cross-correlating, the frame synchronizing, and the phase error calculating circuits 23 to 25 is supplied with the demodulated data sequence and serves as a carrier regenerating subloop for correcting the phase error of the recovered carrier signal in the carrier regenerating circuit 17.

The first control terminal 21 collectively serve as a correction setting arrangement for using the aperture signal in setting the correct phase angle in the carrier regenerating circuit 17 at the aperture intervals to keep the carrier signal phase angle at the correct phase angle, namely, in setting the phase error in the adjusting element of the carrier regenerating circuit 17 to adjust the carrier signal phase angle at aperture interval if the recovered carrier signal is not identical with the regenerated carrier signal. The recovered carrier signal is thereby rendered identical with the regenerated carrier signal.

The cross-correlation coefficient will now be called a main cross-correlation coefficient and be denoted by $\phi(\tau)$ as a function of a parameter $\tau$ which has a dimension of time. Being a complex-valued signal, the demodulated data sequence can be represented by $r(t)$ which is a complex-valued function of time t. Likewise, the locally known unique word is represented by $y(t)$ as another complex-valued function. The main cross-correlation coefficient is given by an equation:

$$\phi(\tau) = \left[ \int_{-NT}^{NT} r(t) y^*(t + \tau) dt \right] / (2NT), \quad (1)$$

where $y^*(t)$ represents a conjugate function of the locally known unique word, 2N represents a unique word length in bits, and T represents a time slot. If attention is direction to the demodulated unique words, it is possible to represent the demodulated data sequence by:

$$r(t) = y(t) + n(t), \quad (2)$$

where $n(t)$ represents a noise signal.

When Equation (2) is used, Equation (1) can be rewritten into a sum of first and second terms, where the first term represents an autocorrelation coefficient related to the demodulated unique words and has a maximum value at each time instant when each demodulated unique word appears in the demodulated data sequence. The second term represents a subordinate cross-correlation coefficient between the noise signal and the locally known unique word and is identical with a filter output signal of a filter $y(-t)$ which is supplied with the noise signal. In general, the second term is smaller than the first term.

Figure 2:
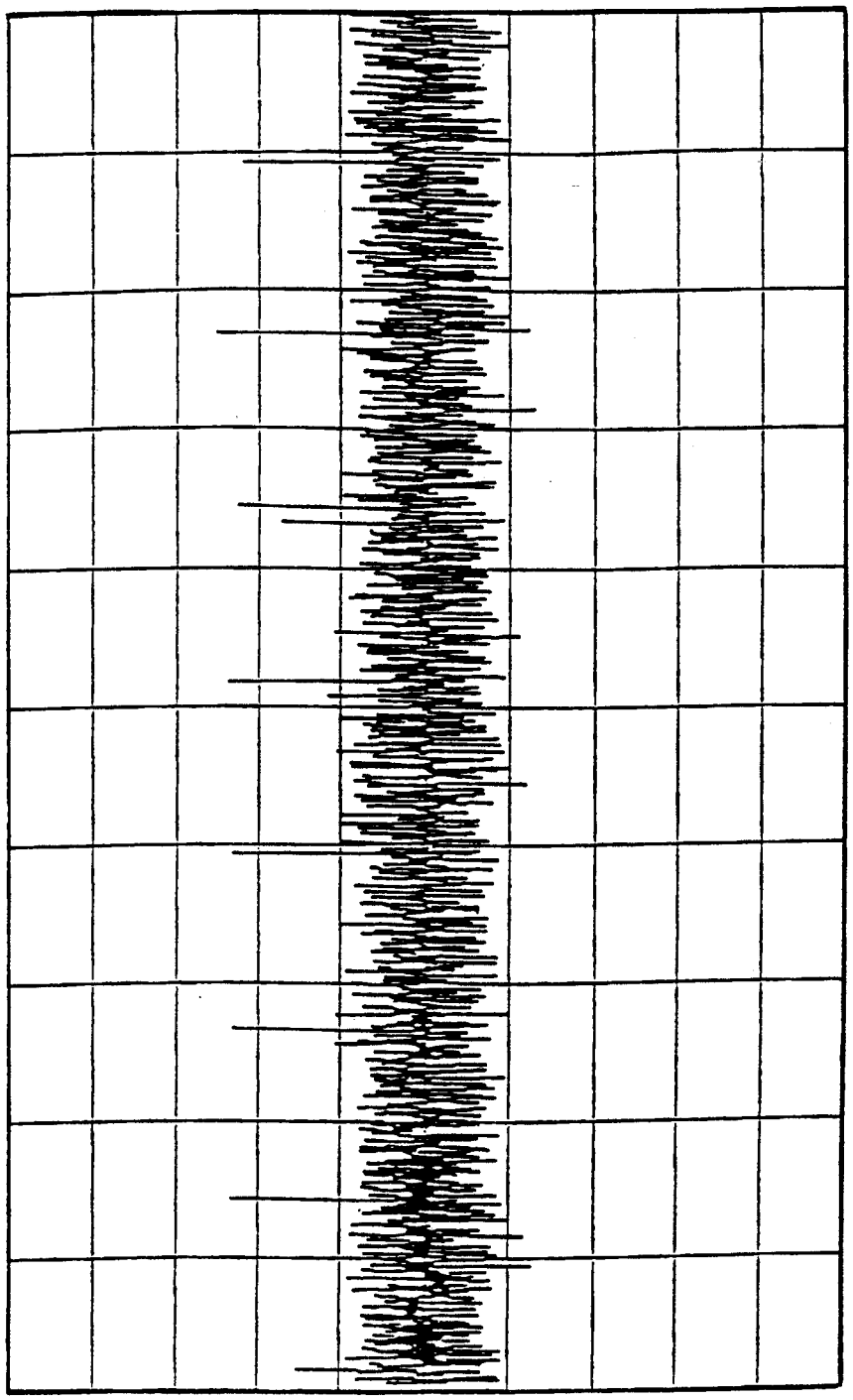
FIG. 2 shows a result of computer simulation of a cross-correlation coefficient used in the carrier regenerating device depicted in FIG. 1.

Referring to FIG. 2, the main cross-correlation coefficient is computer simulated as a simulated coefficient. On carrying out computer simulation, it is surmised that the carrier signal is subjected in the master station to quadrature phase shift keyihg (QPSK) modulation at the frame period of 256 bits by the data signal and the unique words of 64 bits long, and that input modulated signal is supplied to the carrier regenerating device with a carrier to noise (C/N) ratio of 3 dB, namely, with an Eb/No ratio (a ratio of signal energy per bit to noise power per 1 Hz) of 0 dB.

In FIG. 2, the abscissa represents the parameter $\tau$ on a scale which may be different from the unit time used for the time t. The correlation signal has a signal level plotted along the ordinate on an arbitrary scale. It is, however, possible to understand in connection with the simulated coefficient that vertical lines are drawn perpendicularly of the abscissa at a spacing of five time units where each time unit is equal to the frame period divided by $2\pi$. Horizontal lines are drawn perpendicularly of the ordinate to represent plus 1.0 at the top, 0.0 at the middle, and minus 1.0 at the bottom.

Figure 3:
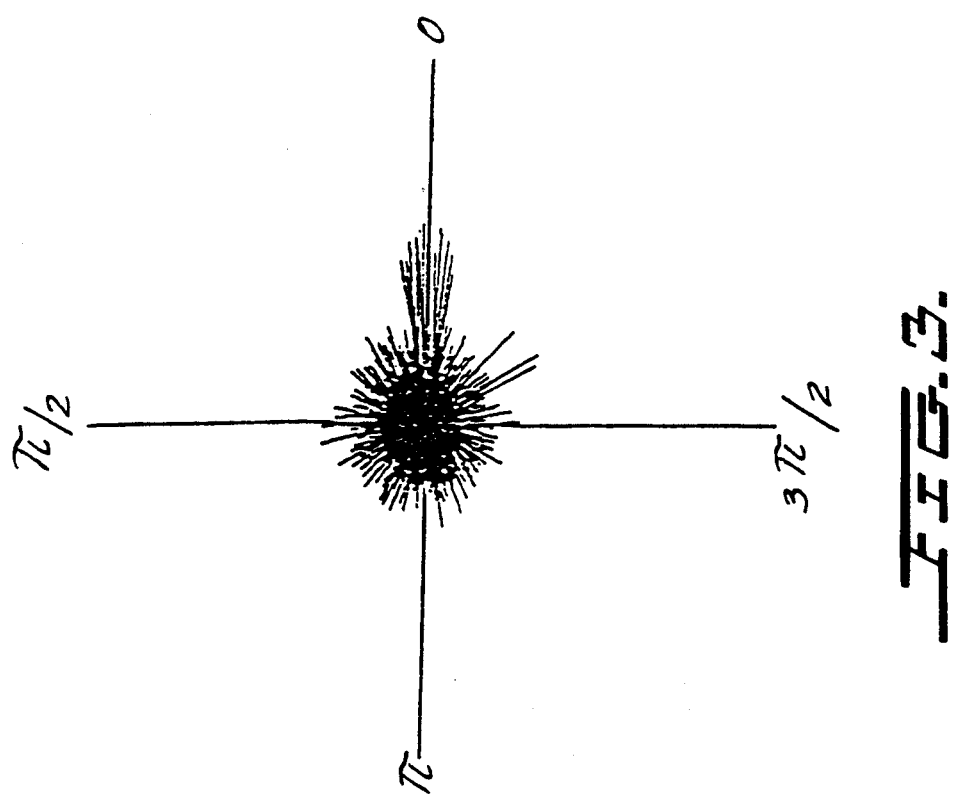
FIG. 3 shows on a phase plane the result illustrated in FIG. 2.

Turning to FIG. 3, the simulated coefficient is illustrated on a phase plane. It should be noted that the cross-correlation signal is a complex-valued signal. Radius vectors represent signal levels of the cross-correlation signal and have arguments $\phi$ which represent correlation signal phase angles and are given by:

$$\phi = \arctan [I(\phi(\tau))]/[R(\phi(\tau))], \quad (3)$$

where R and I are used to represent real and imaginary signal components of the complex-valued cross-correlation signal.

Figure 4:
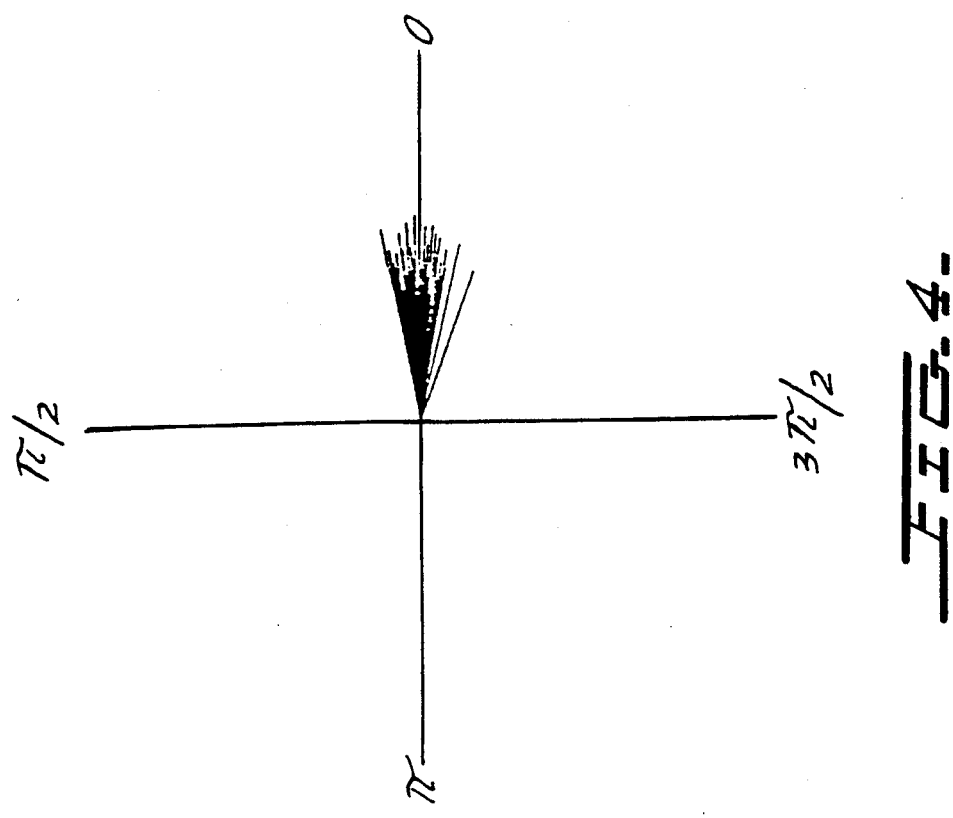
FIG. 4 shows an aperture interval for defining a frame period in the carrier regenerating device depicted in FIG. 1.

Further turning to FIG. 4, the main cross-correlation signal has signal levels above the predetermined threshold value for the simulated coefficient in each time interval which is herein called an aperture interval. It is therefore possible to understand that FIG. 4 illustrates an aperture signal which successively represents aperture intervals at the frame period. The predetermined threshold value can be optimally determined with reference to FIG. 2.

Figure 5:
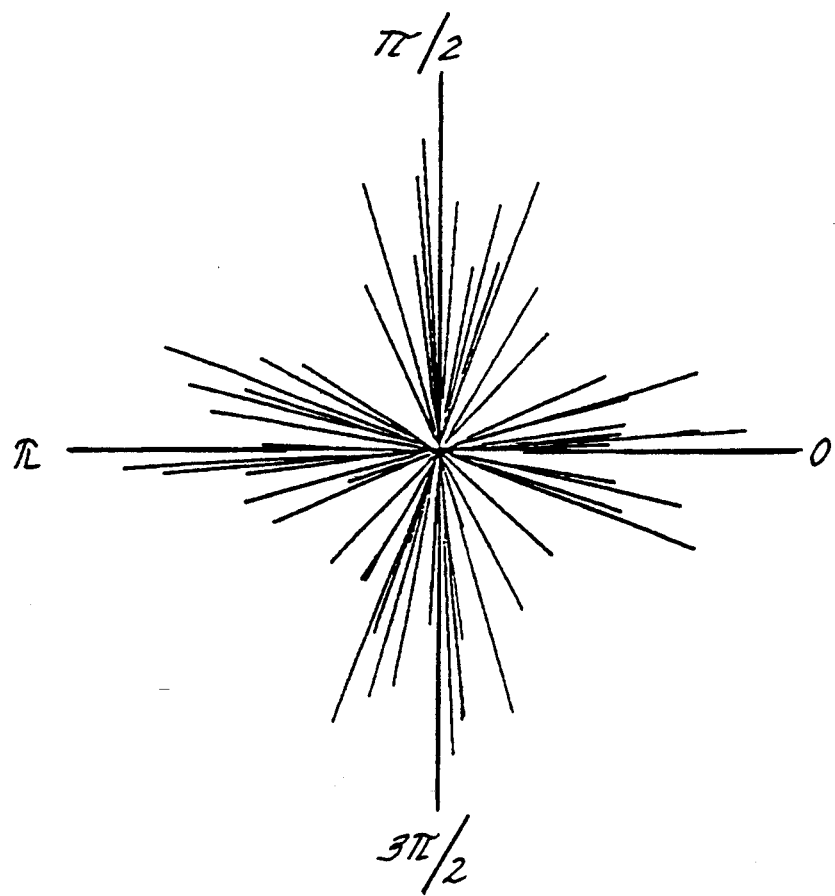
FIG. 5 shows on a phase plane a cross-correlation coefficient which is computer simulated in connection with a case where an input modulated signal is supplied with a severe attenuation to the carrier regenerating device depicted in FIG. 1.

Referring to FIG. 5, the main cross-correlation coefficient is computer simulated in connection with a case where fading occurs in the input modulated signal such that the carrier regenerating circuit 17 is put into the free running state. The recovered carrier signal steps out of the frame synchronism.

Reviewing FIGS. 1 through 5, the frame synchronizing circuit 24 produces the aperture signal which cyclically defines the aperture interval exemplified in FIG. 4. In this manner, the frame synchronizing circuit 24 establishes and keeps the frame synchronism even when the input modulated signal is supplied to the carrier regenerating device below the predetermined signal to noise ratio so that the main cross-correlation signal is undesiredly kept in a state illustrated in FIG. 5.

The phase error calculating circuit 25 uses the real and the imaginary cross-correlation signal components in calculating the correlation signal phase angle in compliance with Equation (3). The correlation signal phase angle gives the correct phase angle. The correlation signal phase angle therefore gives the phase error at each frame period or frame bit interval. In FIG. 4, the phase error is equal to zero.

The phase error calculating circuit 25 can therefore be implemented by a read-only memory (ROM). When each of the real and the imaginary cross-correlation signal components and the phase error signal is an eight-bit signal, the read-only memory should have a memory capacity of 512 kilobits.

It will now be presumed that the recovered carrier signal went out of frame synchronism in the manner illustrated in FIG. 5 and that the input modulated signal afterwards got the predetermined signal to noise ratio at a certain time instant. Under the circumstances, the carrier signal phase angle is adjusted in the carrier regenerating circuit 17 to become equal to the correct phase angle at the aperture interval that is defined by the aperture signal at the time instant in question. It is thereby possible to rapidly recover step out which the frame synchronism of the recovered carrier signal is unavoidably subjected to.

It should be noted in connection with FIGS. 2 and 3 that the noise signal n(t) comprises the demodulated data signal. Depending on noise and on bit patterns of the demodulated data signal, the second term may have a considerably great signal level. The cross-correlation signal may become as exemplified in FIG. 5. Even in such an event, the carrier regenerating device is well operable because the aperture interval is specified at the frame period.

Figure 6:
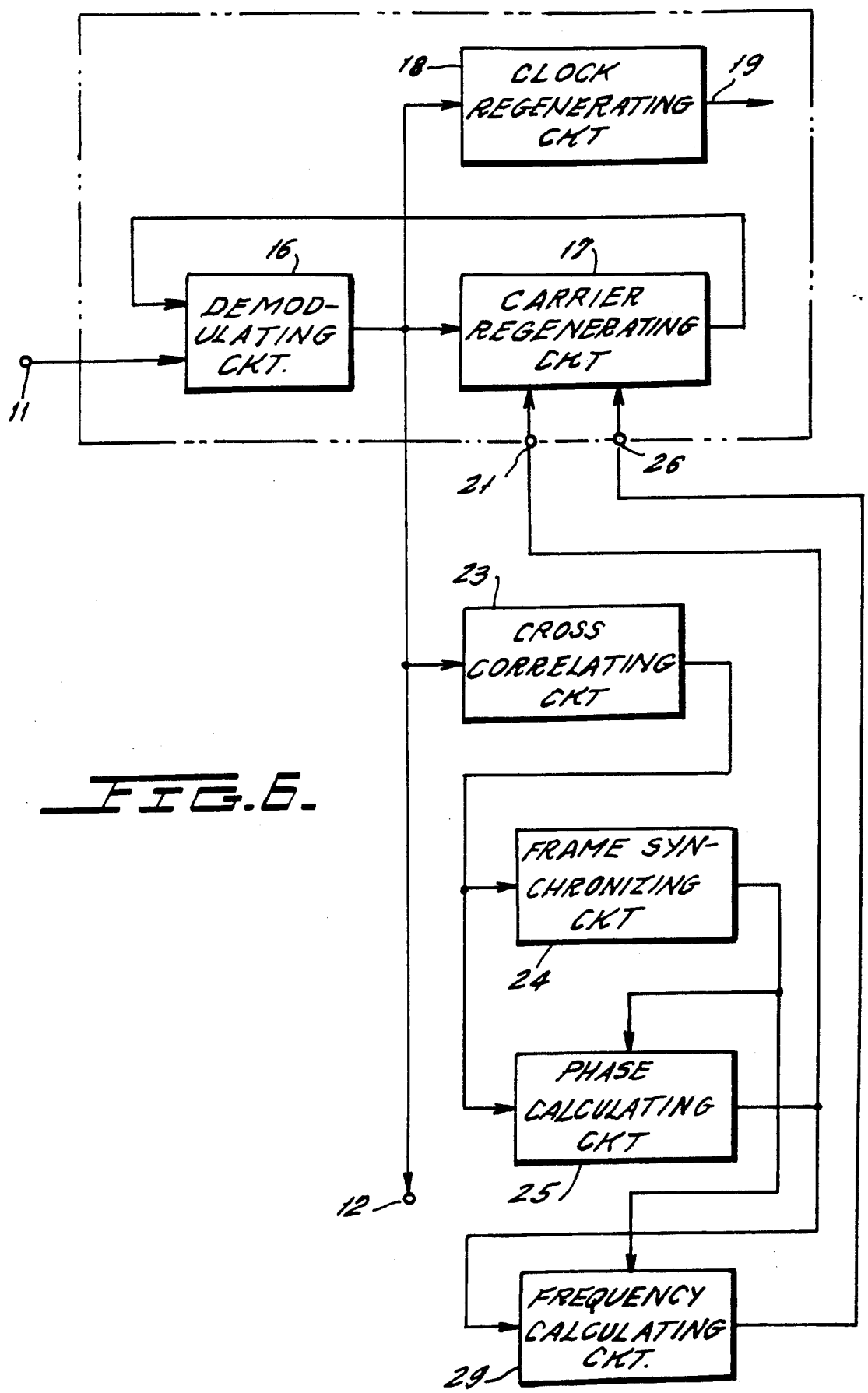
FIG. 6 is a block diagram of a carrier regenerating device according to a second embodiment of this invention.

Referring now to FIG. 6, the description will proceed to a carrier regenerating device according to a second embodiment of this invention. Similar parts are designated by like reference numerals and are similarly operable with likewise named signals. It should be noted that the adjusting element of the carrier regenerating circuit 17 has a second control terminal 26 which is again depicted separately from the carrier regenerating circuit 17.

In the manner pointed out heretobefore, the recovered carrier signal may have a frequency error relative to the regenerated carrier signal. In other words, the recovered carrier signal may have a carrier signal frequency different from the regenerated carrier signal. A frequency error calculating circuit 29 is supplied with the phase error signal from the phase error calculating circuit 25 and is controlled by the aperture signal delivered from the frame synchronizing circuit 24. The frequency error calculating circuit 29 is alternatively called a freqeuncy calculating circuit and is for calculating such frequency errors at the aperture interval, respectively, to produce a frequency error signal which represents the frequency errors and is delivered to the second control terminal 26.

The frequency error calculating circuit 29 is operable as follows. The phase error signal is used at first in calculating a phase angle sequence of the correlation signal phase angles $\phi(1), \phi(2), \ldots, \phi(m), \ldots,$ and $\phi(M)$ according to Equation (3) at first through M-th frame periods or frame bit instants, where M represents a duration of the message in frame periods and where m is variable between 1 and M, both inclusive. An error function E(t) will be used in connection with angular frequency to represent the frequency error which is variable with time t. At the m-th frame period, the error function has an m-th error function phase given by an equation:

$$\theta(mKT) = \int_0^{mKT} E(t)dt + \phi(0),$$

where K represents the frame period in bits and $\phi(0)$ represents an initial phase. At the aperture intervals which succesively specify the first through the M-th frame periods, the error function phases are compared with the correlation signal phase angles of the phase angle sequence. For example, $(\theta(2KT) - \theta(KT))$ is compared with $(\phi(2) - \phi(1))$.

Results of comparison are used in calculating an optimum error function ê(t) which minimizes an evaluation function:

$$\sum_{m=2}^{M} [(\phi(m) - \phi(m-1)) - (\theta(mKT) - \theta((m-1)KT))]^2,$$

and which can be represented by a finite power series:

$$\hat{E}(t) = E(0) + E(1)t + \ldots + E(m)t^m + \ldots.$$

The frequency error is given by the zeroth-order term of the finite power series and will be denoted by E(f).

Alternatively, the frequency error can approximately be given by a different equation:

$$E(f) = d[\phi(m) - \phi(m-1)]/dt.$$

This approximation is effective in rapidly establishing the frame synchronism. It will now be readily possible for one skilled in the art to implement the frequency error calculating circuit 29 by a microprocessor irrespective of minimization of the evaluation function or solution of the differential equation.

The above-mentioned carrier regenerating subloop now comprises the frequency error calculating circuit 29 besides the cross-correlating, the frame synchronizing, and the phase error calculating circuits 23 to 25. The subloop is supplied with the demodulated data sequence as before and corrects the phase and the frequency errors of the recovered carrier signal in the carrier regenerating circuit 17.

Figure 7:
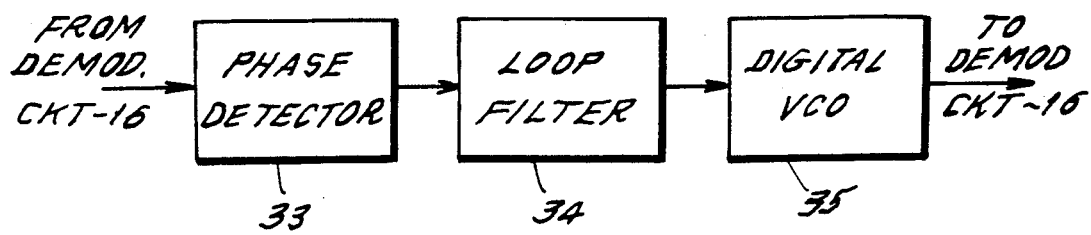
FIG. 7 is a block diagram of a carrier regenerating circuit for use in the carrier regenerating device illustrated in FIG. 6.

Turning to FIG. 7, the carrier regenerating circuit 17 illustrated with reference to FIG. 6 comprises a phase detector 33, a loop filter 34, and a digtial voltage controlled oscillator (digital VCO) 35. The phase detector 33 is supplied with the demodulated data sequence of the demodulating circuit 16, detects a phase error signal with a predetermined phase, and a outputs a phase error signal. The loop filter 34 is supplied with the phase error signal of the phase detector 33, filters the phase error signal, and outputs a filtered phase error signal as a frequency signal. The digital VCO 35 as a integrator circuit is supplied with the filtered phase error signal as the frequency signal and delivers a recovered carrier signal to the demodulating circuit 16.

Figure 8:
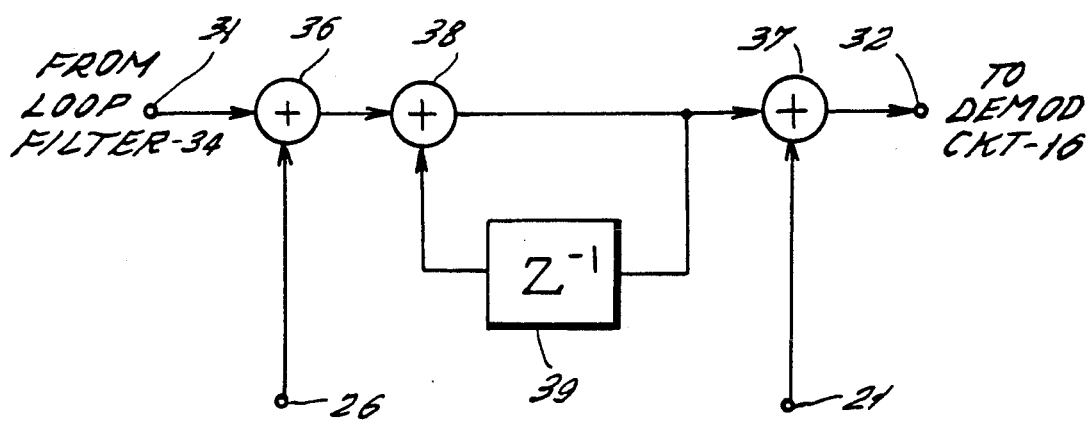
FIG. 8 is a block diagram of a digital VCO for use in the carrier regenerating circuit illustrated in FIG. 7.

FIG. 8 illustrates the digital VCO 35 which has oscillator input and output terminals 31 and 32. The oscillator input terminal 31 is for receiving the filtered phase error signal as the frequency signal from the loop filter 34. The oscillator output terminal 32 is for delivering the recovered carrier signal back to the demodulating circuit 16.

An input adder 36 is supplied with the filtered phase error signal as the frequency signal through the oscillator input terminal 31 and with the frequency error signal from the frequency error calculating circuit 29 through the second control terminal 26 when the aperture from the frame synchronizing circuit 24 is supplied to the frequency error calculating circuit 29, i.e., when non-synchronization is established. However, the frequency error signal is not supplied to the carrier regenerating circuit 17 when th aperture is not supplied to the frequency error calculating circuit 29, i.e., when synchronization is established. The input adder 36 thereby produces an input sum signal. An output adder 37 is supplied with the phase error signal from the phase error calculating circuit 25 through the first control terminal 21 and with an intermediate sum signal which will be described very soon when the aperture is supplied to the phase error calculating circuit 25, i.e., when non-synchronization is established. However, the phase error signal from the phase error calculating circuit 25 is not supplied to the carrier regenerating circuit 17 when the aperture is not supplied to the phase error calculating circuit 25, i.e., when synchronization is established. The output adder 37 thereby delivers the recovered carrier signal to the oscillator output terminal 32.

The input sum signal is supplied to an intermediate adder 38 for producing the intermediate sum signal, which has a current value renewed to a renewed value at each aperture interval and is delivered not only to the output adder 37 but also to a delay circuit 39 for producing a delayed signal by giving a delay $Z^{-1}$ to the intermediate signal of the current value. The delayed signal is supplied to the intermediate adder 38 to make the intermediate signal represent the renewed value.

If each of the phase and the frequency errors is equal to zero, the digital VCO is operable as a digital integrator circuit. When the phase error signal is supplied to the output adder 37, the recovered carrier signal is rendered identical with the regenerated carrier signal as regards the carrier signal phase angle. When the phase and the frequency error signals are used, the recovered carrier signal becomes correctly identical with the regenerated carrier signal not only as regards the carrier signal phase angle but also as regards the carrier signal frequency.

It is now understood that the carrier regenerating circuit 17 comprises the phase detector 33, the loop filter 34, and the input and the output adders 36 and 37 as first and second adjusting elements and a combination of the intermediate adder 38 and the delay circuit 39 as a carrier recovering unit for use in recovering the recovered carrier signal from the frequency signal with the carrier signal phase angle and with the carrier signal frequency. The first adjusting element (36) is supplied with the filtered phase error signal as the frequency signal for making the carrier recovering unit produce the intermediate sum signal as the recovered carrier signal having an adjusted frequency into which the carrier sinal frequency is adjusted in compliance with a first amount of adjustment. The second adjusting element (37) is supplied with the recovered carrier signal having the adjusted frequency for adjusting the carrier signal phase angle into an adjusted phase angle in accordance with a second amount of adjustment.

The above-described correction setting arrangement (21, 26) is connected to the first and the second adjusting elements. The correction setting arrangement is for setting the frequency errors in the first adjusting element as the first amount of adjustment at aperture interval and is for setting the phase errors in the second adjusting element as the second amount of adjustment at aperture interval. The correction setting arrangement thereby renders the recovered carrier signal having the adjusted frequency and the adjusted phase angle identical with the regenerated carrier signal not only as regards the carrier signal phase angle but also as regards the carrier signal frequency.

It is now understood that a combination of the first and the second control terminals 21 and 26 serves as the correction setting arrangement in the carrier regenerating device illustrated with reference to FIGS. 6 and 8. The correction setting arrangement is connected to the first and the second adjusting elements (36, 37) and is for setting the frequency errors in the first adjusting element as the first amount of adjustment at each of the aperture intervals and for setting the phase errors in the second adjusting element as the second amount of adjustment at each of the aperture intervals to make the recovered carrier signal with the adjusted phase angle and with the adjusted frequency become identical with the regenerated carrier signal not only as regards phase but also as regards frequency.

For use in the carrier regenerating device illustrated with reference to FIG. 1, the digital voltage controlled oscillator need not comprise the input adder 36 but the output adder 37 as a single adjusting element. The carrier recovering unit is for recovering the recovered carrier signal from the filtered phase error signal with a carrier signal phase angle. The single adjusting element is supplied with the recovered carrier signal for adjusting the carrier signal phase angle in accordance with an amount of adjustment into an adjusted phase angle to produce the recovered carrier signal with the adjusted phase angle.

The above-described correction setting arrangement 21 is connected to the single adjusting element. The correction setting arrangement is for setting the phase errors in the single adjusting element as the amount of adjustment at each of the aperture intervals to make the recovered carrier signal having the adjusted phase angle become identical with the regenerated carrier signal.

While this invention has thus far been described in specific conjunction with only two preferred embodiments thereof, it will now be readily possible for one skilled in the art to carry this invention into effect in various other manners. For example, the input modulated signal may include the modulated unique words at the frame period partly among the modulated data signal and at one or a plurality of integral multiples of the frame period among a remaining part of the modulated data signal. The input modulated signal may be derived by subjecting the carrier signal to any manner of modulation, such as binary phase shift keying (BPSK) modulation. The aperture signal from the frame synchronizing circuit may be supplied to only the carrier regenerating circuit. Then, the carrier regenerating circuit inputs the phase error signal and frequency error signal when the circuit is supplied with the aperture, but the phase calculating circuit and the frequency calculating circuit always deliver the phase error signal and the frequency error signal, respectively.

What is claimed is:

1. A carrier regenerating device for regenerating a regenerated carrier signal from a modulated overall signal having a frame period and comprising a modulated data signal and modulated unique words which are periodically interspersed in said modulated data signal, said carrier regenerating device comprising:
   a demodulating circuit for using said regenerated carrier signal in demodulating said modulated overall signal to produce a demodulated overall signal comprising a demodulated data signal and demodulated unique words;
   a carrier regenerating circuit for recovering a recovered carrier signal from said demodulated overall signal;
   a cross-correlating circuit for calculating a cross-correlation coefficient between said demodulated overall signal and a locally known unique word;
   a frame synchronizing circuit for using said cross-correlation coefficient in producing an aperture signal which defines aperture intervals at said frame period when said cross-correlation coefficient is lower than a predetermined threshold value;
   a phase error calculating circuit for using said cross-correlation coefficient in calculating a phase error which said recovered carrier signal has relative to said regenerated carrier signal; and
   correction setting means for using said aperture signal in setting said phase error at said aperture intervals in said carrier regenerating circuit to make said recovered carrier signal become said regenerated carrier signal.

2. A carrier regenerating device as claimed in claim 1, wherein:
   said carrier regenerating circuit is for recovering from said demodulated overall signal said recovered carrier signal with a carrier signal phase angle;
   said correction setting means being for setting said phase error in said carrier regenerating circuit at said aperture intervals to adjust said carrier signal phase angle by said phase error to make said recovered carrier signal become said regenerated carrier signal.

3. A carrier regenerating device for regenerating a regenerated carrier signal from a modulated overall signal having a frame period and comprising a modulated data signal and modulated unique words which are periodically interspersed in said modulated data signal, said carrier regenerating device comprising:
   a demodulator circuit for using said regenerated carrier signal in demodulating said modulated overall signal to produce a demodulated overall signal comprising a demodulated data signal and demodulated unique words;
   a carrier regenerating circuit for recovering a recovered carrier signal from said demodulated overall signal;
   a cross-correlating circuit for calculating a cross-correlation coefficient between said demodulated overall signal and a locally known unique word;
   a frame synchronizing circuit for using said cross-correlation coefficient in producing an aperture signal which defines aperture intervals at said frame period when said cross-correlation is below a predetermined threshold value;
   a phase error calculating circuit for using said cross-correlation coefficient and said aperture signal in calculating phase errors which said recovered carrier signal has relative to said regenerated carrier signal at said aperture intervals, respectively; and
   correction setting means for successively setting said phase errors in said carrier regenerating circuit at said aperture intervals to make said recovered carrier signal become said regenerated carrier signal.

4. A carrier regenerating device as claimed in claim 3, wherein:
   said carrier regenerating circuit comprises:
   carrier recovering means for recovering said recovered carrier signal from said demodulated overall signal with a carrier signal phase angle; and
   an adjusting element supplied with said recovered carrier signal for adjusting said carrier signal phase angle with an amount of adjustment into an adjusted phase angle to produce said recovered carrier signal with said adjusted phase angle;
   said correction setting means being connected to said adjusting element for setting said phase errors in said adjusting element as said amount of adjustment at each of said aperture intervals to make the recovered carrier signal with said adjusted phase angle become identical with said regenerated carrier signal.

5. A carrier regenerating device as claimed in claim 3, further comprising:
   a frequency error calculating circuit for using said aperture signal and said phase errors in calculating frequency errors which said recovered carrier signal has relative to said regenerated carrier signal at said aperture intervals;
   said correction setting means being for setting said frequency errors in said carrier regenerating circuit at said aperture intervals to make said recovered carrier signal become identical with said regenerated carrier signal not only as regards phase but also as regards frequency.

6. A carrier regenerating device as claimed in claim 5, wherein:
   said carrier regenerating circuit comprises:
   carrier recovering means for recovering said recovered carrier signal from said demodulated overall signal with a carrier phase angle and with a carrier frequency;
   a first adjusting element supplied with said demodulated overall signal for making said carrier recovering means produce said recovered carrier signal with an adjusted frequency into which said carrier signal frequency is adjusted in accordance with a first amount of adjustment; and
   a second adjusting element supplied with the recovered carrier signal having said adjusted frequency for adjusting said carrier phase angle in accordance with a second amount of adjustment into an adjusted phase angle;
   said correction setting means being connected to said first and said second adjusting elements for setting said frequency errors in said first adjusting element as said first amount of adjustment at each of said aperture intervals and for setting said phase errors in said second adjusting element as said second amount of adjustment at each of said aperture intervals to make the recovered carrier signal having said adjusted phase angle and said adjusted frequency become identical with said regenerated carrier signal not only as regards phase but also as regards frequency.

* * * * *